(12) United States Patent
Fischer et al.

(10) Patent No.: US 11,774,740 B2
(45) Date of Patent: Oct. 3, 2023

(54) APPARATUS FOR MONITORING A FOCAL STATE OF MICROSCOPE

(71) Applicant: Abberior Instruments GmbH, Goettingen (DE)

(72) Inventors: Joachim Fischer, Karlsruhe (DE); Matthias Henrich, Heidelberg (DE); Winfried Willemer, Bovenden (DE)

(73) Assignee: ABBERIOR INSTRUMENTS GMBH, Goettingen (DE)

( * ) Notice: Subject to any disclaimer, the term of this patent is extended or adjusted under 35 U.S.C. 154(b) by 490 days.

(21) Appl. No.: 16/881,260

(22) Filed: May 22, 2020

(65) Prior Publication Data

US 2020/0371339 A1    Nov. 26, 2020

(30) Foreign Application Priority Data

May 24, 2019   (DE) .................... 10 2019 113 975.9

(51) Int. Cl.
  *G02B 21/00*    (2006.01)
  *G02B 21/06*    (2006.01)
  *G02B 21/36*    (2006.01)

(52) U.S. Cl.
  CPC ....... *G02B 21/367* (2013.01); *G02B 21/0032* (2013.01); *G02B 21/0036* (2013.01); *G02B 21/362* (2013.01); *G02B 21/364* (2013.01)

(58) Field of Classification Search
  CPC ................ G02B 21/00; G02B 21/0004; G02B 21/0016; G02B 21/002; G02B 21/0024;
  (Continued)

(56) References Cited

U.S. PATENT DOCUMENTS

| | | | |
|---|---|---|---|
| 3,721,827 | A | 3/1973 | Reinheimer |
| 4,769,530 | A | 9/1988 | Miyahara |

(Continued)

FOREIGN PATENT DOCUMENTS

| | | |
|---|---|---|
| DE | 2102922 A1 | 9/1972 |
| DE | 3641048 A1 | 6/1987 |

(Continued)

OTHER PUBLICATIONS

Extended European Search Report in co-pending related EP Application No. 20175352.2, dated Nov. 17, 2020.

*Primary Examiner* — Thong Q Nguyen
(74) *Attorney, Agent, or Firm* — Thomas | Horstemeyer, LLP

(57) ABSTRACT

An apparatus is provided for monitoring a focal state of a microscope having an object plane and a main imaging area. The apparatus has an auxiliary light source providing an auxiliary light beam and coupling the auxiliary light beam into the microscope in such a way that the coupled auxiliary light beam runs within a plane which is spanned outside of the main imaging area by a straight line running in the object plane and a normal to the object plane, and that the coupled auxiliary light beam is inclined at an angle to a normal to the object plane. A part of the coupled auxiliary light beam reflected by a reference boundary surface in the microscope impinges on a registration device in an area of incidence. The registration device registers position changes of the area of incidence on the registration device.

24 Claims, 6 Drawing Sheets

(58) Field of Classification Search
CPC ............ G02B 21/0028; G02B 21/0032; G02B 21/0036; G02B 21/0048; G02B 21/0052; G02B 21/006; G02B 21/008; G02B 21/06; G02B 21/24; G02B 21/241; G02B 21/2454; G02B 21/245; G02B 21/36; G02B 21/361; G02B 21/365; G02B 21/367
USPC .................................................. 359/368–398
See application file for complete search history.

(56) References Cited

U.S. PATENT DOCUMENTS

| | | | |
|---|---|---|---|
| 5,136,149 | A | 8/1992 | Fujiwara et al. |
| 5,288,987 | A | 2/1994 | Vry et al. |
| 5,925,874 | A | 7/1999 | Liegel et al. |
| 6,594,006 | B1 | 7/2003 | Muehlhoff et al. |
| 8,629,382 | B2 * | 1/2014 | Sase .................... G02B 21/245 356/123 |
| 2003/0147134 | A1 | 1/2003 | Cemic |
| 2003/0112504 | A1 | 6/2003 | Czarnetzki et al. |
| 2010/0060883 | A1 * | 3/2010 | Heiden .................... G02B 7/32 356/126 |
| 2013/0070076 | A1 | 3/2013 | Kuster |
| 2017/0090175 | A1 * | 3/2017 | Kobayashi ............. G02B 7/287 |

FOREIGN PATENT DOCUMENTS

| | | |
|---|---|---|
| DE | 4131737 A1 | 3/1993 |
| DE | 19725483 A1 | 1/1998 |
| DE | 102009019290 A1 | 11/2010 |
| DE | 102011082756 A1 | 3/2013 |
| DE | 102015108912 A1 | 8/2016 |
| EP | 0453946 A2 | 10/1991 |
| EP | 1 333 304 A1 * | 8/2003 |
| WO | 0072078 A1 | 11/2000 |
| WO | 2004029691 A1 | 4/2004 |
| WO | 2010135323 A1 | 11/2010 |

* cited by examiner

APPARATUS FOR MONITORING A FOCAL STATE OF MICROSCOPE

CROSS REFERENCE TO RELATED APPLICATIONS

This application claims priority to co-pending German patent application No. 10 2019 113 975.9 entitled "Verfahren and Vorrichtung zum Überwachen des Fokuszustands eines Mikroskops" and filed on May 24, 2019.

FIELD OF THE INVENTION

The present invention relates to an apparatus for monitoring a focal state of a microscope having an object plane and a main imaging area. More particular, the present invention relates to such an apparatus comprising an auxiliary light source configured and arranged within the apparatus to provide an auxiliary light beam and to couple the auxiliary light beam into the microscope, and a registration device arranged within the apparatus such that a part of the coupled auxiliary light beam reflected by a reference boundary surface in the microscope impinges on the registration device in an area of incidence and configured to register position changes of the area of incidence on the registration device.

If one or more images which shall sharply image a same plane of an object are taken over an extended period of time by means of an imaging system, the focus state of the imaging system has to remain unchanged or to be kept constant. This particularly applies to taking pictures of higher or highest resolution by means of microscopes. Here, it often occurs that an unavoidable spatial drift moves the object plane of the microscope over relevant distances with regard to the object even during taking a single image. This is, on the one hand, due to the fact that high resolution methods need comparatively long measurement periods per image point so that taking a single image needs a longer period of time, and, on the other hand, due to the fact that the limits to an irrelevant drift are very low due to the high spatial resolution. If a spatial resolution in z-direction of, for example, 100 nm is achieved in imaging, the drift in z-direction over the entire imaging period has to be kept considerably below 100 nm. As a rule, this requires to register and compensate the actually occurring drift.

BACKGROUND OF THE INVENTION

German patent application publication DE 21 02 922 A and U.S. Pat. No. 3,721,827 belonging to the same patent family disclose a method of automatically focusing on an object to be viewed in a microscope. In the method, a bundle of non-visible rays is used which, upon deviations of a plane of an object from a focus plane of an objective of the microscope, photo-electrically excites a control device which returns the plane of the object into the focus plane. The bundle of non-visible rays is coupled into the illumination beam path of the microscope by means of a mirror in such a way that it laterally extends over one half of the cross-section of the beam path, only, and that it is reflected by the object into the other half of the beam path and thus gets to the photo-electrical control device. Due to the deviation of the reflecting plane of the object, the position of the reflected bundle of non-visible rays focused onto the photo-electrical device changes on the photo-electrical device. In this known method, the non-visible rays impinge on the object in the main imaging area of the microscope.

German patent application publication DE 36 41 048 A1 and U.S. Pat. No. 4,769,530 belonging to the same patent family disclose an apparatus comprising an optical system having an objective, and devices for detecting the degree of focusing of the optical system. Via an optical path which is oblique to the optical axis of the optical system, the devices projects infrared rays onto an object, and information on the degree of focusing of the optical viewing system for the object is obtained on basis of a deviation of the rays reflected by the object from the optical axis. Particularly, the devices for detecting the degree of focusing comprise light emitting devices for projecting the infrared rays along the optical path oblique to the optical axis of the optical system, and a position registration device for registering offsets of images of the infrared rays reflected by the object. The light emitting devices comprise a plurality of light emitting elements for alternately generating the infrared rays at angles which are symmetric with regard to the optical axis. By means of a $\lambda/4$-plate and a polarizing beam splitter for separating the reflected infrared rays from the infrared beams projected onto the object, reflections of the infrared rays at optical boundary surfaces between the beam splitter and the $\lambda/4$-plate are suppressed. In this known apparatus, the infrared rays also impinge on the object in the main imaging area of the optical system.

European patent EP 0 453 946 and U.S. Pat. No. 5,136,149 belonging to the same patent family disclose a method of focusing an optical head on an object body and an automatic focusing device for an optical inspection system, particularly for semiconductor wafers. The optical head has an objective with a focus point on an optical axis. The method comprises the steps: emitting a collimated light beam; directing the light beam through the objective onto the object body, wherein the light beam is reflected by a surface of the object body to obtain a reflected light beam; subdividing the reflected light beam which has passed through the objective in a first partial light beam and a second partial light beam; forming a light point of the first partial light beam by means of an imaging lens having a focal point; determining a one-dimensional position of incidence of the light point on a first plane which includes the focal point of the imaging lens to obtain a first position deviation value which represents the position deviation of the surface of the object body from the focal point of the objective; detecting the two-dimensional position of incidence of the second light beam on a second plane to obtain an angle deviation value which indicates an angle deviation of the surface of the object body from a reference plane which is perpendicular to the optical axis of the objective; and moving the optical head and the object body for reducing both the position deviation and the angle deviation. The collimated light beam is focused in the focal point of the objective, and the collimated light beam running through the beam path of the optical head is parallel to its optical axis. The light beam directed onto the object body is offset with regard to the optical axis in a direction, whereas the reflected light beam is offset with regard to the optical axis in an opposite direction. Thus, the light beam runs from one side of the optical axis to the reflecting surface of the object body, and, prior to or after reflection at the surface, it runs across the optical axis to its other side and thus through the main imaging area of the objective.

International patent application publication WO 00/72078 A1 and U.S. Pat. No. 6,594,006 belonging to the same patent family a method and an arrangement for monitoring a position of an xy-plane of an object to be scanned and for positioning this xy-plane in the focus plane of a laser scanner of a laser scanning microscope. For this purpose, reflections of three points which are positioned in the xy-plane and which are scanned with a laser beam are localized by means of a position sensitive detector. On this basis, the z-coordinates of the points are determined by triangulation. Then, the z-coordinates of these three points are equalized with regard to each other to align the xy-plane parallel to the focus plane of the laser scanner. Further, a parallel shift in z-direction may be executed until the reflections from the three points are imaged onto the detector at a maximum intensity, because this ensures at a high security that the scanned xy-plane coincides with the focus plane. Even if the three points to be scanned shall be located on the periphery of the xy-plane here, they are still in the main imaging area of the laser scanning microscope. This even applies, if a separate laser diode is used to scan the three points.

International patent application publication WO 2004/029691 A1 discloses a method of determining a distance between a reference plane and an inner or outer optical boundary surface of an object. The method is particularly proposed for autofocusing a microscope and includes the following steps: generating a collimated light beam; coupling the collimated light beam into an optic having an objective lens and a tube lens in such a way that the collimated light beam emitted in a transversal manner onto the tube lens; detecting the position of the light beam reflected by a first inner or outer optical boundary surface of an object and emerging out of the tube lens; and generating a first signal indicating the position. Based on this first signal, a distance between the reference plane and the first boundary surface is determined with regard to absolute value and direction. With a tele-centric arrangement of the objective lens and the tube lens, which is designated as usual in WO 2004/029691 A1, the collimated light beam impinging on the tube lens is focused in the back focus plane of the objective lens. If the collimated light beam runs at an inclination angle with regard to the optical axis but centrally through the back focus plane of the tube lens, the focus point of the light beam is laterally offset to the optical axis. The incident angle of the light beam is selected such that the light beam gets to the focus point and into the objective lens, and runs unhindered through the objective lens. Due to the offset of the focus point to the optical axis, the beam emerging out of the objective lens is inclined again. In this way, it impinges on the optical boundary surface of the object and is reflected back into the objective lens. Behind the tube lens, the reflected light beam is collimated again and the collimated light beam impinges on the position sensitive detector. In the known method, the light beam emerging out of the objective lens runs from one side of the optical axis to the reflecting boundary surface, and, prior to or after reflection by the reference boundary surface, it runs across the optical axis onto the other side of the optical axis and thus through the main imaging area of the microscope.

If an auxiliary light beam used for monitoring the focus state of a microscope runs through the main imaging area of the microscope, the auxiliary light beam is always associated with a danger of disturbing the imaging of an object by means of the microscope. One may deal with this danger by using an auxiliary light beam which is non-visible in imaging and/or by means of a beam splitter separating the reflected part of the auxiliary light beam. A selective separation of the reflected part of the auxiliary light beam requires that the auxiliary light beam differs from the light used for imaging. For this reason, many autofocus devices use an infrared auxiliary light beam. If, however, the light used for imaging and the auxiliary light beam clearly differ, for example, with regard to their wavelengths, there is the general danger that the auxiliary light beam does not monitor the same focus state as it is of interest with regard to the light used for imaging. Further, any optical element arranged in the imaging beam path of a microscope for separating the reflected part of the auxiliary light beam is associated with a danger of deteriorating the imaging quality of the microscope.

German patent application publication DE 10 2009 019 290 A1 discloses a microscope apparatus comprising an objective, a tube lens, a light source for illuminating a sample, an optic for coupling the illumination light into the objective, a field delimiting element, a detector for illumination light reflected by a sample boundary surface, and an device for directing a part of the illumination light reflected by the sample boundary surface and running backwards through at least a part of the optic for coupling the illumination light onto a detector. Here, an arrangement of the delimiting element, the device for directing the part of the illumination light reflected by the sample boundary surface and the detector is selected such that the intensity distribution of the reflected light on the detector surface varies depending on the distance between the objective and the sample boundary surface so that the detector signal is a measure of the focusing onto the object. In the known microscope apparatus, no additional light source is used for the focus measurement. Instead, illumination light anyway present for the operation of the microscope is used. For this purpose, the fact is utilized that a spatially delimited illumination beam, after reflection by the sample boundary surface, passes through a reference surface at a lateral offset, and that, with a fixed angle of incidence, the actual beam offset depends on the degree of the focusing. The device for directing the part of the illumination light reflected by the sample boundary surface onto the detector may particularly be arranged in the peripheral area of the incident beam of the illumination light, i.e. at a position at which the illumination beam is not at all affected or only affected in such a way that the field of view viewed by an eye or the camera is not obstructed.

There still is a need of an apparatus for monitoring a focus state of a microscope, which is usable with different microscopes and while imaging an object of interest without impairing this imaging in any way.

SUMMARY OF THE INVENTION

The present invention relates to an apparatus for monitoring a focal state of a microscope having an object plane and a main imaging area. The apparatus comprises an auxiliary light source configured and arranged within the apparatus to provide an auxiliary light beam and to couple the auxiliary light beam into the microscope in such a way that the coupled auxiliary light beam runs within a plane which is spanned outside of the main imaging area by a straight line running in the object plane and a normal to the object plane and is inclined at an angle to a normal to the object plane. The apparatus further comprises a registration device arranged within the apparatus such that a part of the coupled auxiliary light beam reflected by a reference boundary surface in the microscope impinges on the registration device in an area of incidence. The registration device is configured to register position changes of the area of incidence on the registration device.

Further, the present invention relates to a microscope comprising an imaging system and an apparatus of the invention for monitoring the focal state of the microscope.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components of the drawings are not necessarily to scale, emphasize instead being placed upon clearly illustrating the principles of the present invention. In the drawings, like reference numerals designate corresponding parts throughout the several views.

DETAILED DESCRIPTION

Figure 1:
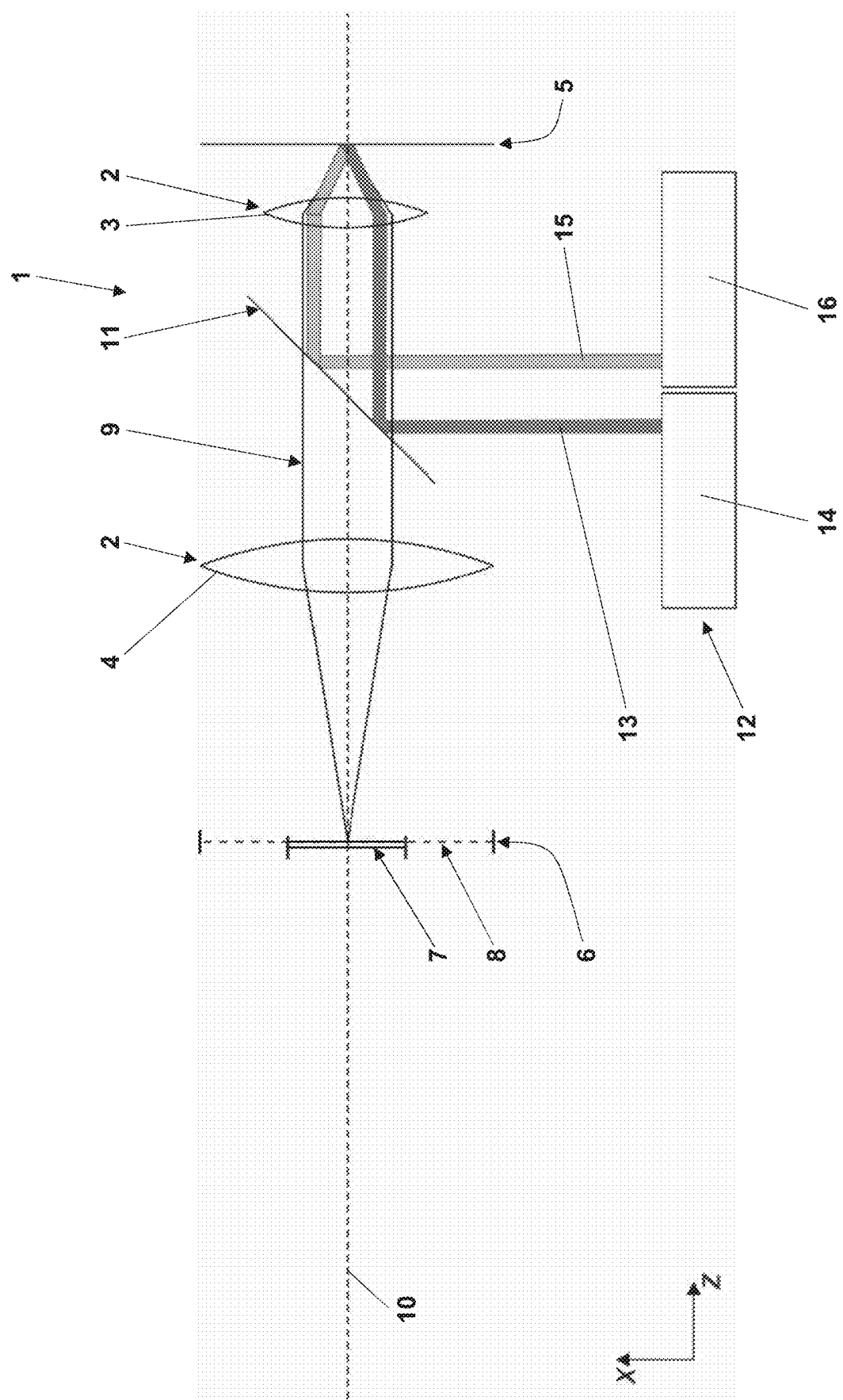
FIG. 1 is a schematic side view of a first embodiment of a microscope according to the present disclosure comprising a first embodiment of the apparatus according to the present disclosure.

According to the present disclosure, in an apparatus of monitoring a focus state of a microscope, an auxiliary light beam is coupled into the microscope in a such a way that it runs in a plane spanned outside of the main imaging area of the microscope by a straight line running in an object plane of the microscope and a normal to the object plane at an angle of inclination with regard to the normal to the object plane. Position changes of an area of incidence of a part of the coupled auxiliary light beam which is reflected by a reference boundary surface on a registration device are registered. These position changes on the registration device indicate changes of the focus state of the microscope.

According to the present disclosure, the auxiliary light beam is coupled into the objective in such a way that it does not impinge on the object plane within the main imaging area of the microscope but such that both the auxiliary light beam and its part reflected by the reference boundary surface run completely outside of the main imaging area of the microscope. Neither the auxiliary light beam nor its part reflected by the reference boundary layer crosses the main beam paths of the microscope assigned to the main imaging area in spatial areas which are directly in front of or behind the object plane. Although the auxiliary light beam and its part reflected by the reference boundary surface run through the microscope, they have no influence on the imaging of the main imaging area by means of the microscope. Correspondingly, the monitoring according to the present disclosure may be carried out while simultaneously imaging an object in the main imaging area even if the auxiliary light beam, with regard to its wave length, falls into a same wave length range as a light which is registered for imaging the main imaging area or which is used as excitation light for exciting the object, for example, in laser scanning fluorescence light microscopy.

That neither the auxiliary light beam itself nor its part reflected by the reference boundary surface runs through the main imaging area, and that both the auxiliary light beam and its part reflected by the reference boundary surface do not cross the associated main beam path of the microscope close to the object plane is achieved in that the coupled auxiliary light beam runs in that virtual plane which is spanned outside of the main imaging area of the microscope by the straight line running in the object plane and the normal to the object plane. This characterizing feature of the monitoring according to the present disclosure implies that the straight line runs at a distance to an optical axis of the microscope in the object plane, because the straight line would otherwise run through the main imaging area which is regularly extending around the optical axis of the microscope.

That neither the auxiliary light beam itself nor its part reflected by the reference boundary surface run through the main imaging area, and that neither the auxiliary light beam nor its part reflected by the reference boundary area crosses the associated main beam path of the microscope close the object plane also means that neither the auxiliary light beam nor its part reflected by the reference boundary surface run through the image of the main imaging area in any image plane of the microscope, and that neither the auxiliary light beam nor its part reflected by the reference boundary surface crosses the main beam path of the microscope assigned to the main imaging area close to any image plane of the microscope. Thus, in monitoring according to the present disclosure, coupling the auxiliary light beam into the microscope and coupling the part of the auxiliary light beam reflected by the reference boundary surface out of the microscope are easily accomplished in any imaging plane without disturbing the main beam path of the microscope assigned to the main imaging area. Insofar as an image plane of the microscope is mentioned here, this refers to any image plane even if the respective plane could more exactly be called an intermediate image plane.

Both if the auxiliary light beam is collimated in the area of the object plane and if the auxiliary light beam diverges or converges in the area of the object plane, the feature that the auxiliary light beam runs in the plane spanned by the straight line and the normal to the object plane means that its beam axis runs within that plane. This also applies to the reflected part of the auxiliary light beam insofar as it also runs in that plane. Insofar as the auxiliary light beam is completely reflected by the reference boundary surface, which may be any boundary surface between media of different refractive indices, however, it runs in the plane spanned by the straight line running in the object plane and the normal to the object plane up to its reflection by the reference boundary surface.

Due to the fact that the auxiliary light beam is only inclined with regard to the normal to the object plane within the plane spanned by the straight line and the normal to the object plane, the part of the auxiliary light beam reflected by the reference boundary surface also runs in this plane and thus outside of the main imaging area. At least this applies to a reference boundary surface which is parallel to the object plane or which is not tilted with regard to the object plane about the straight line. This, however, is not just the normal case but it is known to be ensured in using a microscope, see WO 00/72078 A1.

The position changes of the area of incidence of the part of the coupled auxiliary light beam reflected by the reference boundary surface occur along an intersection line between the registration device and an image of the plane which is spanned by the straight line running in the object plane and the normal to the object plane. These position changes indicate any changes of the focus state of the microscope occurring.

Particularly, a distance of the straight line spanning the plane together with the normal to the object plane to the optical axis of the microscope may be at least 5 mm/M or even at least 10 mm/M, wherein M is the magnification of the microscope. Correspondingly, the diameter of the main imaging area may be at least close to 10 mm or at least close to 20 mm divided by the magnification of the microscope.

In practice, the main imaging area outside of which the straight line runs through the object plane, is, for example, defined by that area of the object plane which is imaged or mapped onto a camera or any other image sensor of the microscope, or which is scanned by a scanner of the microscope. If the microscope has a scanner, the main imaging area may alternatively be defined as that largest area or that largest rectangular area of the object plane which is scanned by the scanner with a measuring beam. If such a scanner is present, the auxiliary light beam is, as a rule, coupled into the microscope on the object side of this scanner in the monitoring according to the present disclosure.

According to the present disclosure, the auxiliary light beam may really or virtually intersect a perpendicular projection of the optical axis of the microscope onto the plane spanned by the straight line and the normal to the object plane in the object plane. Alternatively, such a real or virtual point of intersection may purposefully be located in front of or behind the object plane. In this way, it can be ensured for a certain reference boundary surface that the reflected part of the auxiliary light beam gets back through the objective of the microscope to the registration device. Further, the position of the area of incidence of the reflected part of the coupled auxiliary light beam on the registration device may, for a desired position of the reference boundary surface, for example be adjusted to the center of the registration device such that any movement of the reference boundary area with regard to the microscope is registered up to a same absolute value in both axial directions. Typically, the auxiliary light beam intersects the perpendicular projection of the optical axis on the spanned plane at a maximum distance of 100 μm or of 50 μm or of even only 10 μm to the object plane.

The angle of inclination between the normal to the object plane and the auxiliary light beam defines the size or value of the position change of the area of incidence of the reflected part of the coupled in auxiliary light beam on the registration device with a certain change of focus occurring. Thus, in the monitoring according to the present disclosure, the inclination angle between the normal to the object plane and the auxiliary light beam is in any case clearly different from zero. The larger the angle of inclination the larger the position change with a same change of focus. Thus, a large angle of inclination may be advantageous. However, the maximum angles of inclination both of the auxiliary light beam and its reflected part are limited by the numerical aperture NA of the objective of the imaging system of the microscope. Thus, the inclination angle between the normal to the object plane and the auxiliary light beam is typically between arcsin(0.1 NA/n) and arcsin(1 NA/n) or between arcsin(0.5 NA/n) and arcsin(1 NA/n), wherein n is a refractive index of a last optical medium through which the auxiliary light beam gets to the reference boundary surface.

At this point, it may be remarked that the value of the angle of inclination of the auxiliary light beam changes which each passing through any optical boundary surface at which the refractive index changes. The angle of inclination most relevant in the monitoring according to the present disclosure is that one at which the auxiliary light beam impinges on the reference boundary surface.

A large angle of inclination of the auxiliary light beam results in large position changes of the reflected part of the auxiliary light beam with any focus changes occurring. Larger focus changes, however, may result in that the part of the auxiliary light beam reflected by the reference boundary area is so strongly offset laterally that it is outside of the viewing field of the microscope and that it, thus, not gets to the registration device. For this reason, it may be suitable to couple both the auxiliary light beam and a further auxiliary light beam, which differ with regard to their angles of inclination with regard to the normal to the object plane, into the microscope, simultaneously or one after the other, to register position changes of areas of incidence of parts of both auxiliary light beams reflected by the reference boundary surface on the registration device. Thus, both small focus changes can be registered at a high resolution and large focus changes can be registered at all.

Further, the auxiliary light beam and a further auxiliary light beam, which differ with regard to the directions of the straight lines in the object plane that, together with the normal to the object plane, span the two planes in which the two auxiliary light beams run, may be coupled into the microscope, simultaneously or one after the other, to register position changes of areas of incidence of parts of both auxiliary light beams reflected by the reference boundary surface on the registration device. With same angles of inclination of both auxiliary light beams, focus changes in direction of the optical axis of the microscope lead to position changes of the areas of incidence of a same size or value independent of the direction of the straight lines which, together with the normal to the object plane, span the planes in which the auxiliary light beams run. However, tilting of the reference boundary surface about the respective straight line results in that the area of incidence of the reflected part of the respective auxiliary light beam on the registration device moves with increasing angle of inclination out of the plane spanned by this straight line together with the normal to the object plane or out of its projection onto the registration device, respectively. This movement indicates a tilt about this particular straight line. A tilt of the reference boundary surface about a further straight line running perpendicular to this straight line within the object plane, however, results in a position change of the area of incidence within the plane spanned by this straight line together with the normal to the object plane or within its projection onto the registration device, respectively. As such, this position change cannot be distinguished from a position change which is due to an axial focus change. By means of the further auxiliary light beam which runs through the further plane which is spanned by the further straight line which preferably runs perpendicular to the straight line together with the normal to the object plane, however, a differentiation is possible. Here, tiltings of the reference boundary area about the two straight lines have exactly opposite effects on the position changes of the area of incidence of the reflected part of the auxiliary light beam. Thus, tilting about the further straight line here causes the lateral movement of the area of incidence which is independent of axial focus changes. Thus, with considering the position changes of the areas of incidence of the reflected parts of both auxiliary light beams, it is possible to differentiate between the axial focus change and the focus changes due to tilting the reference boundary surface about the two straight lines. Thus, monitoring according to the present disclosure also completely resolves possibly occurring tilts of the reference boundary surface.

According to the present disclosure, a tilt of the reference boundary surface about a further straight line, which runs in the object plane perpendicular to the straight line and which, together with the normal to the object plane, spans the plane in which the auxiliary light beam runs, may also differentiated from an axial focus change, which results in a position change of the area of incidence of the reflected part of the auxiliary light beam in the same direction, on the following basis. If a further auxiliary light beam is oriented in the same plane but at another angle of inclination, a ratio of the values of the position changes of the areas of incidence of the reflected parts of both auxiliary light beams, which equals a ratio of the tangents of the angles of incidence of the two auxiliary light beams on the reference boundary surface, remains constant in case of an axial focus change which does not change the angles of incidence. A tilt of the reference boundary surface changes the angles of incidence by a same value. However, due to the tangents, the resulting ratio of the values of the position changes of the areas of incidence of the reflected parts of both auxiliary light beams varies. From the actual ratio of the values of the position changes as compared to the ratio without tilt of the reference boundary area, the tilt may not only be noticed but also determined with regard to its tilt angle.

The preceding considerations assume that neither the auxiliary light beam nor the further auxiliary light beam are focused on the reference boundary surface into a point about which the tilts of the reference boundary surface to be resolved occur. Tilts of the reference boundary surface occurring about a focus point of one of the auxiliary light beams on the reference boundary surface do not result in a position change of the part of the respective auxiliary light beam reflected by the reference boundary surface. However, if the further auxiliary light beam is not focused into the same point on the reference boundary surface as the auxiliary light beam, a position change of the area of incidence of the reflected part of the further auxiliary light beam indicates that there is a tilt of the reference boundary surface about the focus point of the auxiliary light beam which does not result in a position change of the area of incidence of the reflected part of the auxiliary light beam on the registration device. Such a tilt will only then not be recognized at all, if it by chance also occurs about a focus point of the further auxiliary light beam on the reference boundary surface. Even such a tilt could be resolved by an even further auxiliary light beam which either impinges on the reference boundary surface in a third point and/or which is not focused on the reference boundary surface. With every auxiliary light beam not focused on the reference boundary surface, a tilt of the reference boundary surface results in a position change of the area of incidence of its reflected part on the registration device.

The auxiliary light beam may be collimated in the object plane, or it may be focused into a point close to the object plane which is typically not further away from the object plane than 100 μm or 50 μm or even only 10 μm. In a telecentric imaging system, which only means here that a tube lens and an objective lens of the imaging system are arranged at a distance of a sum of their focal lengths, an auxiliary light beam collimated in the object plane is also collimated in each image plane of the microscope and also in each projection of the plane spanned by the straight line and the normal to the object plane onto the registration device that is close to any image plane of the microscope. The area of incidence of the reflected part of the auxiliary light beam on the registration device is thus spatially delimited and easily registrable even with greater axial focus changes. On the other hand, the reflected part of an auxiliary light beam focused onto the reference boundary surface or in a point in front of or behind the reference boundary surface may be focused in an even stronger localized area of incidence on the registration device whose position changes may correspondingly registered at an even higher precision, i.e. at an even higher resolution. This focusing, however, is quickly lost with axial focus changes so that a determination of the position of the area of incidence on the registration device is quickly no longer possible in a suitable way. Thus, it is often suitable that the auxiliary light beam and a further auxiliary light beam, which differ in the positions of the points into which they are focused with regard to the object plane, are coupled into the microscope one after the other to register position changes of areas of incidence of parts of both light beams reflected by the reference boundary surface on the registration device. The position infinitive (∞), meaning that the auxiliary light beam or the further auxiliary light beam is collimated in the object plane, may belong to these positions into which the auxiliary light beam or the further auxiliary light beam are focused.

In an embodiment of the present disclosure, the part of the coupled auxiliary light beam reflected by the reference boundary area may be purposefully collimated when incident on the registration device or focused on the registration device. As a consequence, the monitoring according to the present disclosure is robust with regard to any effects of non-telecentric imaging systems. In such non-telecentric imaging systems, the auxiliary light beam is, as a rule, not collimated in the object plane but it only has a small divergence here, if its reflected part is collimated when incident on the registration device.

Focusing the auxiliary light beam into a point in the object plane or close to the object plane, collimating the auxiliary light beam in the object plane or on the registration device, and focusing the part of the coupled auxiliary light beam reflected by the reference boundary surface on the registration device may be effected by an electrically controllable liquid lens. If just a single liquid lens is present in the auxiliary light beam, it is to be understood that no simultaneous focusing of the part of the auxiliary light beam reflected by a certain reference boundary surface on the registration device and focusing of the auxiliary light beam in different points close to the object plane is possible. However, focusing into the vicinity of the object plane and simultaneously focusing on the registration device for different reference boundary surfaces, on the one hand, and collimating or adjusting a limited divergence of the auxiliary light beam in the object plane and collimating the auxiliary light beam when incident on the registration device, on the other hand, are possible.

Liquid lenses. i. e. electrically controllable lenses of variable focal length, are generally known. Their imaging properties may be improper for various applications. However, for the objects of forming the auxiliary light beam described here, a liquid lens is fully sufficient.

As the auxiliary light beam runs in the plane spanned by the straight line and the normal to the object plane outside of the main imaging area of the microscope, it also runs outside of the main beam path of the microscope assigned to the main imaging area even within a larger area in front of and behind the object plane and each image plane of the microscope. Thus, according to the present disclosure, the auxiliary light beam can be coupled into the microscope by means of a reflective element which is arranged outside of the main beam path of the microscope, and the part of the auxiliary light beam reflected by the reference boundary area can be coupled out of the microscope towards the registration device by means of this reflective element. Particularly, this reflective element can be arranged such that its reflective surface intersects an intermediate image plane of the microscope.

Further, everywhere, where the auxiliary light beam and its reflected part run outside of the main imaging area in the area of each image plane of the microscope, an optical element may be arranged through which the auxiliary light beam coupled into the beam path of the microscope and the part of the auxiliary light beam reflected by the reference boundary surface and not yet coupled out of the beam path of the microscope pass through. This optical element has no influence on the main beam path of the microscope and does thus not affect the imaging quality of the microscope. Particularly, the at least one optical element may be a λ/2-plate. Such a λ/2-plate may, for example be used in combination with a polarizing beam splitter for separating the part of the auxiliary light beam reflected by the reference boundary surface from the auxiliary light beam to suppress reflections of the auxiliary light beam at other boundary surfaces located on the object side of the polarizing beam splitter. Due to the λ/2-plate, these reflections have a polarization which is not transmitted towards the registration device, because these reflections are not reflected at a relevant angle of incidence. The part of the auxiliary light beam which, due to the angle of inclination of the auxiliary light beam with regard to the normal to the object plane, is reflected by the reference boundary surface at a high angle of incidence is, however, only attenuated by 25% and thus dominates on the registration device. It is to be understood that this only applies to orientations of the λ/2-plate and the polarizing beam splitter which are adjusted to the direction of the plane in which the auxiliary light beam runs and which is spanned by the straight line in the object plane and the normal to the object plane.

It is to be understood that many embodiments of the present disclosure will include keeping constant a position of the area of incidence of the part of the coupled auxiliary light beam reflected by the reference boundary surface by means of movements of the reference boundary surface with regard to the microscope compensating any registered position changes. Thus, the monitoring according to the present disclosure may thus be used for automatically keeping the focus state of the microscope. This may particularly be the case while an object in the main imaging area of the object plane is simultaneously imaged by means of the microscope. This applies independently of whether the microscope is a scanning microscope or has no scanner. It particularly also applies even if the auxiliary light beam has a wave length which falls in a same wave length range as light which is used in imaging the object in the main imaging area for illuminating or measuring the object. The auxiliary light of the auxiliary light beam does not get into the main imaging area or any of its images. On the other hand, as long as the auxiliary light has another wave length than any light that is used in imaging the object in the main imaging area for illuminating or measuring the object, a band pass filter may be arranged in front of the registration device which selectively only transmits the auxiliary light. This also applies if the wave length of the auxiliary light in a fluorescence light microscope is, for example, between the wave lengths of the excitation light and the fluorescence light excited by means of the excitation light.

As newly occurring, i.e. not yet compensated imaging errors, which are, for example, induced by aberrations caused by changes of temperature and a resulting variation of a refractive index of a medium in which the imaged object is embedded, have an effect on the auxiliary light beam focused in the vicinity of the object plane or on its part reflected by a backward reference boundary surface which is similar with regard to size and shape of the area of incidence of the reflected part on the registration device as in case of axial focus changes, the monitoring to according to the present disclosure may also be used for recognizing newly occurring imaging errors. Particularly, it can be monitored whether the reflected part of the auxiliary light beam is constantly focused sharply onto the registration device or whether the full width at half maximum of its area of incidence varies. Due to the angle at which the auxiliary light beam and its reflected part are inclined with regard to the normal to the object plane, for example, run through the embedding medium, any newly occurring imaging errors have a particularly strong effect on the size and shape of the area of incidence of the reflected part on the registration device.

In an apparatus according to the present disclosure for monitoring the focus state of a microscope, the apparatus comprising an auxiliary light source which is configured and arranged to couple an auxiliary light beam into the microscope in such a way that the coupled auxiliary light beam is inclined at an angle to a normal to an object plane of the microscope, and a registration device which is configured and arranged to register position changes of an incident area of a part of the coupled auxiliary light beam reflected by a reference boundary surface on the registration device, the auxiliary light source and the registration device are configured and arranged to execute the monitoring according to the present disclosure.

The registration device of the apparatus according to the present disclosure may generally comprise any sensor by which a position change of the incident area of the reflected part of the coupled auxiliary light beam can be registered. In an extreme case, this may be a point sensor which only recognizes whether the incident area still impinges on it. Already with only two light sensitive partial areas, the sensor may additionally resolve the direction of the position change of the incident area. When the registration device has a line sensor, both the position and position changes of the incident area of the reflected part of the coupled auxiliary light beam may be registered very precisely. However, line sensors are often not cheaper than two-dimensional cameras or image sensors. Further, two-dimensional cameras or image sensors are also suited for registering lateral deviations of the incident area out of the respective plane spanned by the straight line and the normal to the object plane. Further, by means of a camera, it is easily realized to also register the size and shape of the incident area of the reflected part of the respective auxiliary light beam on the registration device and to monitor them for changes. Further, a single camera may be used for a plurality of differently oriented planes in which several auxiliary light beams run or the reflected parts of these auxiliary light beams, respectively. Further, a camera makes adjusting the apparatus according to the present disclosure easier in that it eases finding the incident area of the reflected part of the coupled auxiliary light beam on the registration device and thus the purposeful arrangement of this incident area at a central point of the registration area so that changes of the focus state are registered in each direction based on the resulting position changes of the incident area on the registration device.

In the apparatus according to the present disclosure, the auxiliary light source may particularly be configured and arranged to couple the auxiliary light beam into the microscope in such a way that the coupled auxiliary light beam runs in a further plane which is spanned outside of the main beam path of the microscope that corresponds to the main imaging area of the microscope by a further straight line running in an image plane of the microscope and a cross axis to this image plane, an angle of inclination of the cross axis to a normal to the image plane being adjustable in a range of at least +/−2° or +/−5°. In a telecentric imaging system, wherein this term also here only means that a tube lens and an objective lens are coaxially arranged at a distance of the sum of their focal lengths in the imaging system, the plane which is spanned by the straight line running in the object plane and the normal to the object plane is mapped to a further plane which is spanned by the further straight line and the normal to the image plane. Correspondingly, the auxiliary light beam is then to be coupled into the microscope such that it runs in this further plane extending at an angle of 90° to the image plane. With a non-telecentric imaging system, however, the plane spanned by the straight line and the object plane and the normal to the object plane is imaged into a further plane which extends at another angle than 90° to the object plane, i.e. at an angle of inclination to the normal to the object plane. This angle of inclination is often in a range of +/−2° at maximum, but sometimes in a range of +/−5°. To be able to use the apparatus according to the present disclosure also with microscopes having a non-telecentric imaging system, an adjustability for covering this range of the angle of inclination is to be provided. For this purpose, for example, a reflective element may be tilted about the further straight line. Further, in non-telecentric imaging systems, an auxiliary light beam collimated in the object plane is divergent or convergent in the image plane and vice versa. This is to be considered in adjusting the divergence of the auxiliary light beam in the auxiliary light source, if a certain divergence of the auxiliary light beam in the object plane is desired.

In the apparatus according to the present disclosure, the coupled auxiliary light beam may really run through the image plane of the microscope. However, the coupled auxiliary light beam may also only run through the image plane virtually, which means, for example, that it runs through a virtual plane corresponding to the image plane in an off-branch branching off from the beam path of the microscope.

The apparatus according to the present disclosure may be part of the microscope whose focus state is to be monitored. Particularly the apparatus according to the present disclosure may be combined with further parts of the microscope in one unit. Particularly, the apparatus may comprise a camera or any other image sensor of the microscope onto which the main imaging area of the microscope is mapped.

Particularly, the apparatus according to the present disclosure may comprise a scanner which is configured to scan the main imaging area of the microscope with a measuring beam. Then, the auxiliary light source and the registration device may particularly be configured and arranged to couple the auxiliary light beam into the microscope on an object side of the scanner and to couple the part of the auxiliary light beam reflected by the reference boundary surface out of the microscope on the objective side of the scanner. In this case, the auxiliary light beam is coupled into the beam path of the microscope outside the working area of the scanner. Thus, there are no interactions even if the coupled auxiliary light beam has a wave length in a same wave length range as at least one component of the measuring beam.

An embodiment of the apparatus according to the present disclosure comprising a scanner may have a form-stable structure to which the scanner, the auxiliary light source and the registration device are mounted. Particularly, this form-stable structure may be a supporting plate. A connector fitting to a camera connector or any other normalized connector of a microscope stative including an imaging system of the microscope, which has a defined position with regard to an image plane of the microscope, may be provided at the form-stable structure. Then, the apparatus of the present disclosure provides for a scanner head for forming a scanning microscope based on the microscope stative, the apparatus being configured to monitor the focus state of the scanning microscope according to the according to the present disclosure. By connecting the connector to the normalized connector of the microscope stative, the apparatus of the present disclosure is brought into a defined position with regard to the image plane of the microscope. Thus, the apparatus may without problem couple the auxiliary light beam as desired with regard to this image plane. If the imaging system of the microscope stative is not telecentric, this non-telecentricity is to be considered as explained above in coupling the auxiliary light beam with regard to the imaging plane and also in adjusting the divergence of the auxiliary light beam.

Preferably, the auxiliary light source has a liquid lens which can be set to different focal lengths in a controlled way, and a lens controller which is configured to shape the auxiliary light beam by means of the liquid lens in such a way that it is collimated in the object plane and thus also collimated in each image plane of the microscope or that it is focused into a point close to the object plane, and/or configured to collimate the part of the coupled-in auxiliary light beam reflected by the reference boundary surface impinging on the registration device or to focus this reflected part on the registration device. The collimation of the reflected part impinging on the registration device is equivalent to that the diameter or the full width at half maximum of the incident area of the reflected part of the coupled auxiliary light beam does not or only little change with occurring larger changes of the focus state, i.e. that the apparatus has a high depth of focus. In practice, collimation of the reflected part impinging on the registration device will often mean that the auxiliary light beam is not collimated in the object plane. However, the divergence of the auxiliary light beam in the area of the object plane will only be small then. Focusing on the registration device is equivalent to that the incident area of the reflected part of the coupled auxiliary light beam has an as small full width at half maximum as possible which allows for a precise determination of its position and of position changes. Here, focusing on the registration device implies, that the auxiliary light beam will also be focused in the or close to the object plane.

The apparatus according to the present disclosure may further have a reflective element which is arranged outside of the main beam path of the microscope corresponding to the main imaging area in such a way that it couples the auxiliary light beam from the auxiliary light source into the microscope and that it couples the part of the auxiliary light beam reflected by the reference boundary surface out of the microscope towards the registration device, without light involved in imaging the main imaging area potentially getting to the reflective element. The reflective element may particularly be arranged such that its reflective surface intersects an intermediate image plane of the microscope.

Further, the apparatus according to the present disclosure may comprise at least one optical element which is arranged outside of the main beam path of the microscope corresponding to the main imaging area and through which the auxiliary light beam coupled into the microscope and the part of the auxiliary light beam reflected by the reference boundary surface and not yet coupled out of the microscope pass through. This at least one further optical element may be a λ/2-plate, particularly, if the apparatus of the present disclosure comprises a beam splitter which separates the part of the auxiliary light beam reflected by the reference boundary surface from the auxiliary light beam, and if this beam splitter is a polarizing beam splitter with a λ/2-plate on its object side to suppress reflections of the auxiliary light beam at other boundary surfaces as compared to those at the reference boundary surface.

The apparatus of the present disclosure preferably also includes a focus state stabilization device which is configured to keep constant a position of the incident area of the part of the coupled auxiliary light beam reflected by the reference boundary surface on the registration device by means of movements of the reference boundary surface with regard to the microscope compensating the registered position changes. Typically, the focus state stabilization device controls an object holder for this purpose, for example, by means of piezo-control members. The piezo-control members are then controlled by the focus state stabilization device such that the reference boundary surface remains in its position with regard to the object plane of the microscope so that an object which is spatially fixed with regard to the reference boundary surface remains in its arrangement with regard to the microscope. This is equivalent to that the focus state of the microscope does not change as it is kept constant. Further, the focus state stabilization device may automatically approach the respective object starting from an unknown focus state in that the object holder is, for example, moved until an outer boundary surface of the object is in the object plane and reflects the auxiliary light beam to the registration device.

A microscope according to the present disclosure having an imaging system comprises the apparatus of the present disclosure for monitoring the focus state of the microscope.

Now referring in greater detail to the drawings, the microscope 1 schematically depicted in FIG. 1 comprises an imaging system 2 including an objective lens 3 and a tube lens 4. The imaging system 2 images or maps an object plane 5 into an image plane 6. A camera 7 is arranged in the image plane 6. The camera 7 defines a main imaging area of the object plane 5. This main imaging area is that area of an object arranged in the object plane 5 which is mapped by the imaging system 2 onto the camera 7. A field of view of the imaging system 2 in the imaging plane 6 is larger than the camera 7. Outside of a main beam path 9 of the microscope 1, which is arranged around an optical axis 10 of the microscope and which corresponds to the main imaging area and the camera 7, but still within the beam path of the microscope 1, which corresponds to the entire field of view 8, a reflective element 11 of an apparatus 12 for monitoring the focus state of the microscope 1 is arranged. The reflective element 11 couples an auxiliary light beam 13 coming from an auxiliary light source 14 into the beam path of the microscope 1 and couples a part 15 of the auxiliary light beam reflected by a reference boundary surface out of the beam path of the microscope 1 towards a registration device 16.

Figure 2:
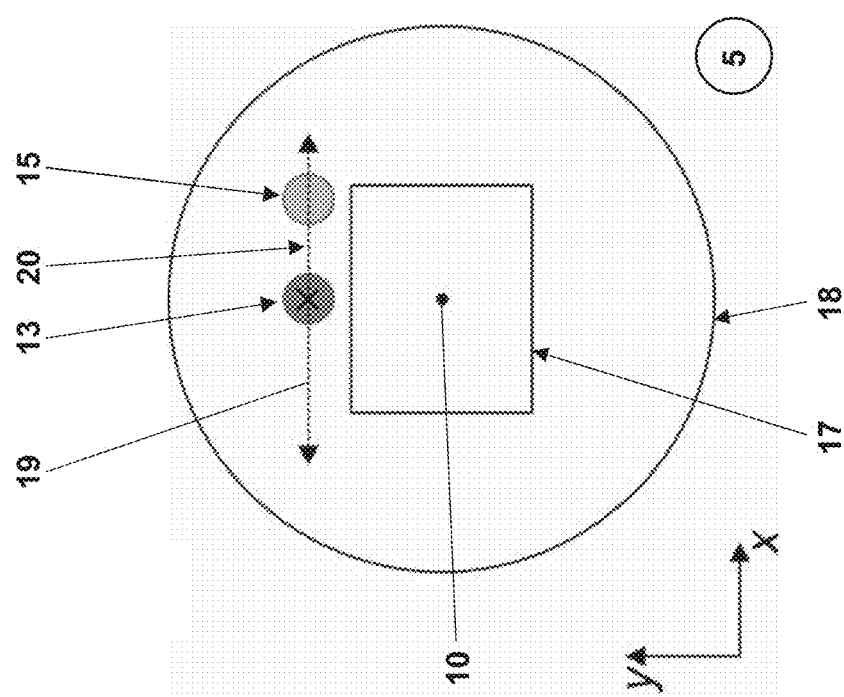
FIG. 2 is an enlarged plane view of an object plane of the microscope of the present disclosure according to FIG. 1.

In a viewing direction along the optical axis 10 on the object plane 5, FIG. 2 shows the rectangular main imaging area 17 corresponding to the camera 7 in the image plane 6 and a larger imaging area 18 corresponding to the field of view 8 according to FIG. 1. A straight line 19 runs through the imaging area 18 in the object plane 5 outside of the main imaging area 17. This straight line 19, together with a normal to the object plane 5, spans a plane in which the auxiliary light beam 13 runs at an angle of inclination to the normal to the object plane 5. The reflected part of the auxiliary light beam also runs back in this plane 20, wherein the reflected part can be offset with regard to the auxiliary light beam 13 in the object plane 5 along the straight line 19, if the reflected part is reflected by a reference boundary surface located behind the object plane 5. This at least applies as long as the reference boundary surface is not tilted about the straight line 19 with regard to the object plane 5. Otherwise, i. e. if the reference boundary surface is tilted about the straight line 19 with regard to the object plane 5, the reflected part 15 moves or drifts out of the plane 20 with increasing tilt angle and with increasing distance of the reflective reference boundary surface to the object plane 5. As long as the reference boundary surface is not tilted, the reflected part 15 stays in the plane 20, and, with varying distance of the reference boundary surface to the object plane 5, it moves on the registration device 16 along the straight line 19 or. more precisely, along a projection of the plane 20 onto the registration device 16.

Figure 3:
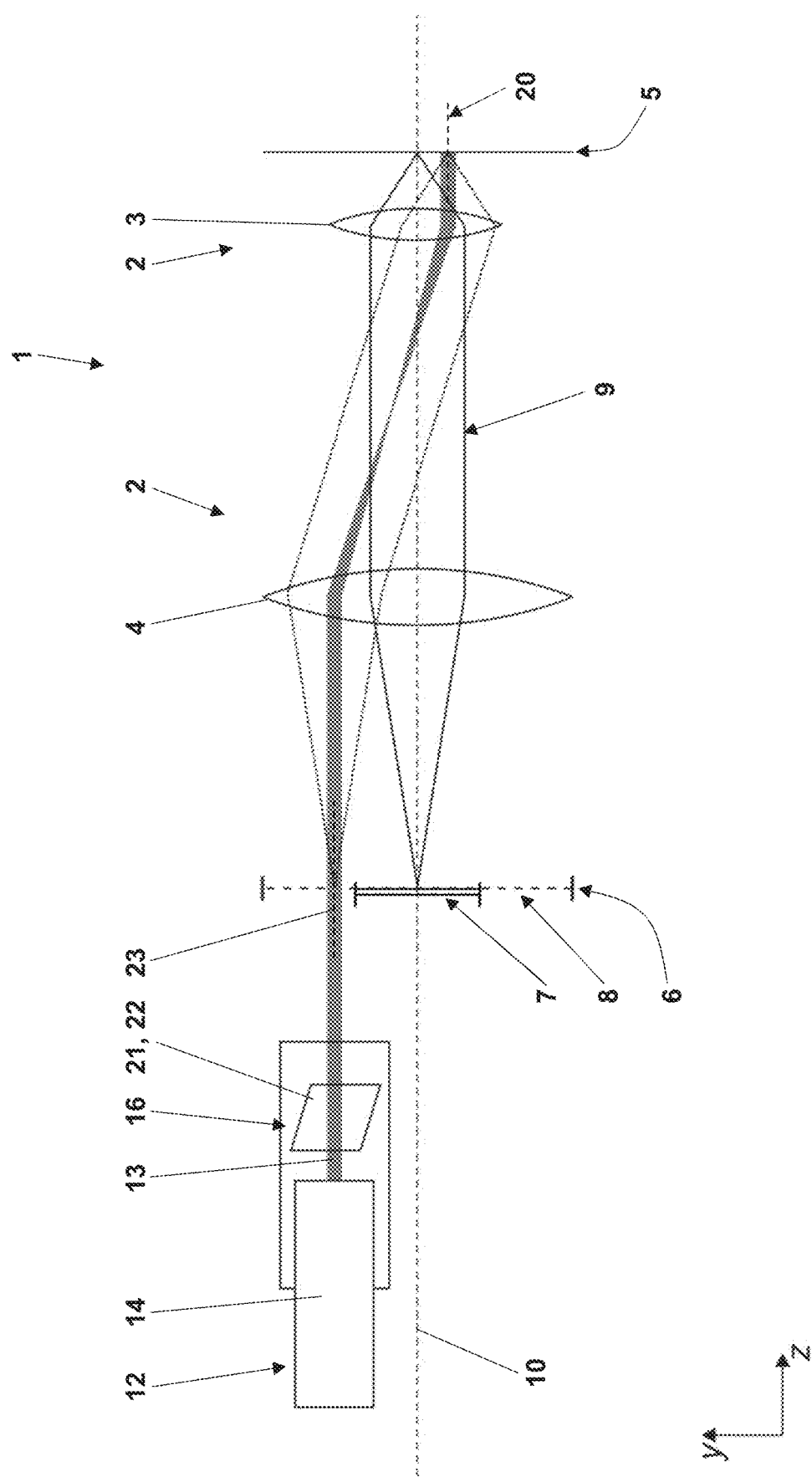
FIG. 3 is a schematic side view of a second embodiment of the microscope according to the present disclosure comprising a second embodiment of the apparatus according to the present disclosure.
Figure 4:
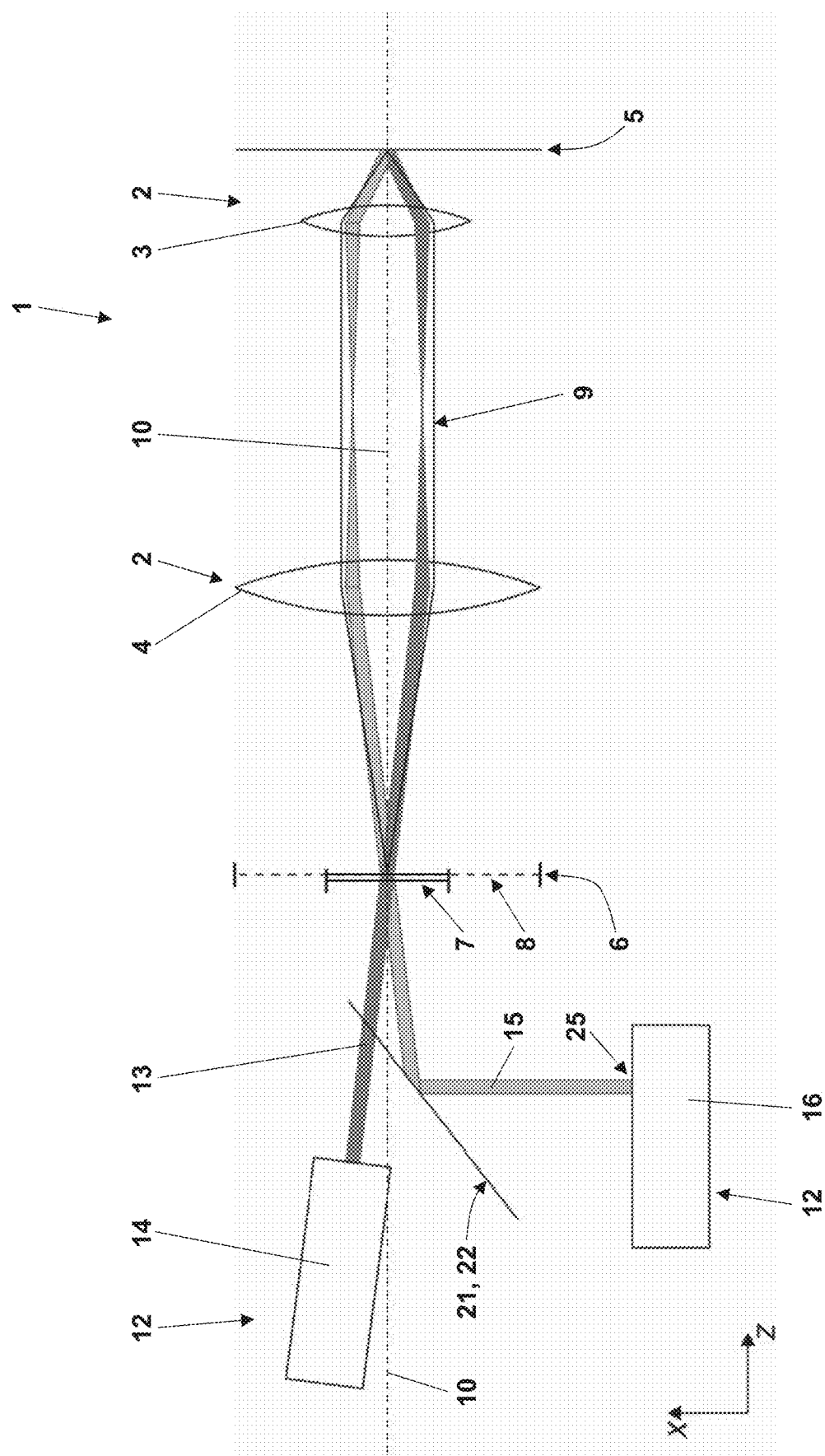
FIG. 4 is a further schematic side view of the microscope of the present disclosure according to FIG. 3 at an angle of 90° to the side view according to FIG. 3.
Figure 5:
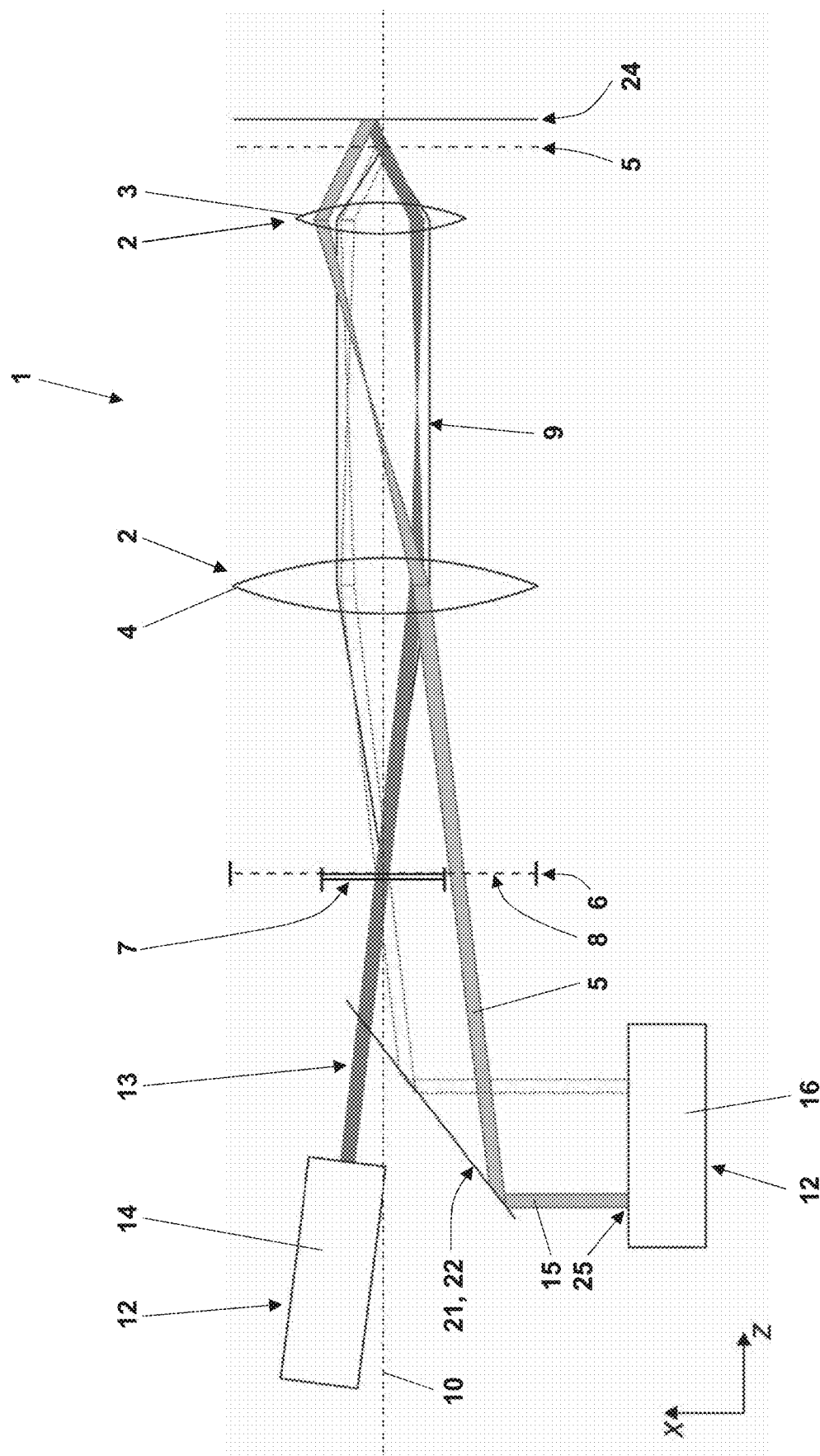
FIG. 5 is a side view corresponding to FIG. 4 of the microscope of the present disclosure according to FIG. 3, which shows the effect of an axially displaced reference boundary surface.

In the embodiment of the microscope 1 of the present disclosure according to FIGS. 3 to 5, the apparatus 12 couples the auxiliary light beam 13 through the intermediate image plane 6, where the field of view 8 extends beyond the camera 7, into the beam path 9 of the microscope 1. This can be taken from the side view according to FIG. 3 but not from the side views according to FIGS. 4 and 5 perpendicular thereto. This, the auxiliary light beam 13 is here coupled into the microscope directly, i.e. without deflection. An optical element 21 arranged outside of the main beam path 9 of the microscope 1 in the image plane 6 is a beam splitter 22, which separates the reflected part 15 of the auxiliary light beam 13 and directs it towards the registration device 16. FIG. 3 depicts the plane 20 in which the auxiliary light beam 13 impinges on the object plane 5 as a straight line. With a telecentric arrangement of the objective lens 3 and the tube lens 4, the auxiliary light beam also runs through a further plane 23 extending at a right angle to the intermediate image plane 6. Without telecentricity, the further plane is slightly inclined with regard to this perpendicular course. The drawing plane of FIG. 4 is parallel to the plane 20 and the further plane 23. Here, it can be seen that the auxiliary light beam 13 is inclined with regard to the normal to the object plane 5 in the plane 20 and with regard to a normal to the image plane 6 in the plane 23 so that the part 15 which is reflected by the object plane 5 in FIG. 4 runs at a same absolute angle of inclination to the respective normal at the other side of the respective normal to the object plane 5 and the image plane 6, respectively. FIG. 5 shows, how a movement of the reflective reference boundary surface 24 with regard to the object plane 5 has an effect on the reflected part 15 and the position of its area 25 of incidence on the registration device 16. With any movement of the reflective reference boundary surface 24 away from the imaging system 2, the incident area 25 moves towards the left. Vice versa, with the reflective reference boundary surface 24 getting closer to the imaging system 2, the incident area moves to the right (not depicted). Thus, an unchanged position of the incident area 25 on the registration device 16 means a fixed distance of the reflective reference boundary surface 24 to the imaging system 2. Correspondingly, an object holder which positions an object having the reflective reference boundary surface 24 with regard to the imaging system 2 can be controlled based on the position of the incident area 25 registered with the registration device 16 in such a way that this position remains constant. Thus, the focus state of the microscope 1 is kept constant.

The embodiments of the microscope 1 of the present disclosure depicted in FIGS. 1 to 5 make use of an auxiliary light beam 13 which is collimated in the object plane 5 and which, correspondingly, is also collimated when impinging on the registration device 16. However, the auxiliary light beam may alternatively be focused onto the object plane 5 or in the vicinity of the object plane 5 or onto the registration device 16.

Figure 6:
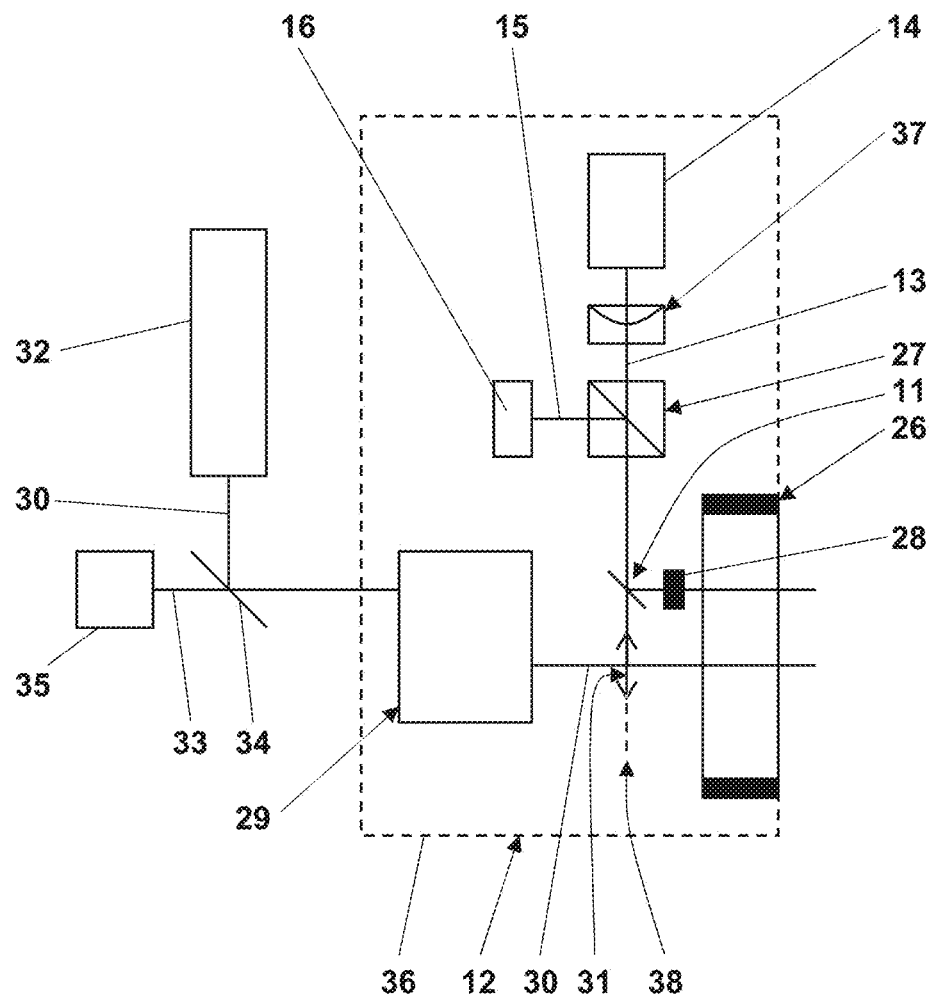
FIG. 6 is a schematic depiction of a further embodiment of the apparatus according to the present disclosure.

FIG. 6 illustrates an embodiment of the apparatus 12 of the present disclosure and further parts of a laser scanning microscope of the present disclosure, but FIG. 6 omits a microscope stative that includes the imaging system 2 of the microscope 1 and the object holder. The depicted apparatus 12 extends up to a connector 26 which fits to a normalized connector of the microscope stative, like, for example, a so called C-mount that has a defined position with regard to an intermediate image plane 38 of the microscope. In this intermediate image plane 38, the reflective element 11 of the apparatus 12 for coupling the auxiliary light beam 13 from the auxiliary light source 14 into the microscope and for coupling the reflected part 15 out of the microscope and towards the registration device 16 is arranged. The reflected part 15 is separated from the auxiliary light beam 13 by means of a polarizing beam splitter 27. A λ/2-plate is arranged on the object side of the reflective element 11. The λ/2-plate 28 serves for suppressing reflections of the auxiliary light beam 13 at optical boundary surfaces on the object side of the beam splitter 27 in the part 15 getting to the registration device 16. The apparatus 12 further includes a scanner 29 for moving a measuring beam 30 directed onto the respective object within a scanning area 31 in the intermediate image plane 38. In this embodiment of the apparatus 12, this scanning area 31 corresponds to the main imaging area of the microscope 1. The reflective element 11 and the λ/2-plate 28 are arranged outside of this scanning area 31 and the corresponding main beam path of the microscope. The scanner 39 may comprise rotating mirrors and will then have at least one rotating mirror per scanning direction. For at least one of the scanning directions, two separately controllable rotating mirrors may be provided. The measuring beam 30 comes from a laser 32. The scanner 39 does not only move the measuring beam 30 but also de-scans light coming from the respective object, whose emission is excited by means of the measuring beam 30, particularly fluorescence light 33 which is separated and directed towards a detector 35 by means of a beam splitter 34. The components of the apparatus 12 enclosed by a dashed line 36 in FIG. 6 are together mounted to a supporting structure which is not separately depicted here. The orientation of the reflective element with regard to this supporting structure may be adjustable to adapt the apparatus 12 to a non-telecentricity of the respective microscope stative. With an electrically controllable liquid lens 37 which is arranged between the polarizing beam splitter 27 and the auxiliary light source 14 made as a laser diode here, the auxiliary light beam 13 or its reflected part 15 can be collimated in the intermediate image plane 38 or focused into a point defined with regard to the intermediate image plane 38 or collimated or focused on the registration device 16.

Many variations and modifications may be made to the preferred embodiments of the invention without departing substantially from the spirit and principles of the invention. All such modifications and variations are intended to be included herein within the scope of the present invention, as defined by the following claims.

We claim:

1. An apparatus for monitoring a focal state of a microscope having an object plane and a main imaging area, the apparatus comprising:
    an auxiliary light source configured and arranged within the apparatus to provide an auxiliary light beam and to couple the auxiliary light beam into the microscope in such a way that the coupled auxiliary light beam impinges on the object plane at an angle of inclination to a normal of the object plane and within an auxiliary plane, the auxiliary plane being spanned by a straight line running in the object plane outside of the main imaging area and the normal to the object plane;
    a registration device arranged within the apparatus such that a reflected part of the coupled auxiliary light beam impinges on the registration device in an area of incidence, the reflected part of the coupled auxiliary light beam reflected by a reference boundary surface in the microscope, the reference boundary surface being in the object plane or at a distance from the object plane,
    wherein the registration device is configured to register position changes of the area of incidence on the registration device to indicate changes of a focus state of the microscope.

2. The apparatus of claim 1, wherein the main imaging area is defined by an area of the object plane that is mapped onto a camera or another an image sensor of the microscope.

3. The apparatus of claim 1,
    wherein the apparatus is configured to couple the auxiliary light beam at an object side of a scanner of the microscope, that scans the object plane with a measuring beam, and
    wherein the main imaging area is defined by
        a largest area of the object plane that is scanned with the measuring beam by the scanner or
        a largest rectangular area of the object plane that is scanned by the scanner with the measuring beam.

4. The apparatus of claim 1, wherein the straight line included in the auxiliary plane is at a distance to an optical axis of the microscope of at least 5 mm/M, wherein M is a magnification of the microscope.

5. The apparatus of claim 1, wherein the angle of inclination between the normal to the object plane and the auxiliary light beam is between arcsin(0.1 NA/n) and arcsin(1 NA/n), wherein NA is a numerical aperture of an imaging system of the microscope and wherein n is a refraction index of a last optical medium through which the auxiliary light beam gets to the reference boundary surface.

6. The apparatus of claim 1, wherein the auxiliary light beam within the auxiliary plane intersects a perpendicular projection of an optical axis of the microscope onto the auxiliary plane
    in the object plane or
    at a maximum distance of 100 μm to the object plane.

7. The apparatus of claim 1, wherein the coupled light beam runs in a further plane which is spanned by a further straight line in an image plane of the microscope and a cross axis of the image plane, the cross axis having an inclination to a normal to the image plane adjustable within a range of at least +/−2°, outside of a main optical path of the microscope that is assigned to the main imaging area.

8. The apparatus of claim 7, wherein the auxiliary light source is configured and arranged within the apparatus to couple the auxiliary light beam into the microscope in such a way that the coupled auxiliary light beam runs through the image plane, really or virtually.

9. The apparatus of claim 1 comprising a camera or an image sensor on which the main imaging area is imaged.

10. The apparatus of claim 1, comprising a scanner which is configured and arranged within the apparatus to scan the main imaging area with a measuring beam, wherein the auxiliary light source and the registration device are configured and arranged within the apparatus to couple the auxiliary light beam into the microscope and to couple the part of the auxiliary light beam reflected by the reference boundary surface out of the microscope, both on an object side of the scanner.

11. The apparatus of claim 10, wherein the coupled auxiliary light beam has a wave length in a same wave length range as the measuring beam.

12. The apparatus of claim 10 comprising a form-stable structure to which the scanner, the auxiliary light source and the registration device are mounted.

13. The apparatus of claim 12, wherein a connector fitting to a camera connector or a normalized connector of a microscope stative of the microscope, which has a defined position with regard to an image plane of the microscope is provided at the form-stable structure.

14. The apparatus of claim 1, wherein the auxiliary light source comprises a liquid lens that can be set to different focal lengths and a lens controller configured for at least one of
shaping the auxiliary light beam by means of the liquid lens such that the auxiliary light beam is collimated in the object plane or focused in a point close to the object plane, and
shaping the auxiliary light beam by means of the liquid lens such that the reflected part of the coupled auxiliary light beam reflected by the reference boundary surface impinging on the registration device is collimated or that the part of the coupled auxiliary light beam reflected by the reference boundary surface is focused on the registration device.

15. The apparatus of claim 1 comprising a reflective element which is arranged outside of a main optical path of the microscope that is assigned to the main imaging area in such a way that the reflective element couples the auxiliary light beam from the auxiliary light source into the microscope and couples the reflected part of the auxiliary light beam reflected by the reference boundary surface out of the microscope towards the registration device.

16. The apparatus of claim 15, wherein the reflective element is arranged such that its reflective surface intersects an image plane of the microscope.

17. The apparatus of claim 1 comprising at least an optical element arranged outside of a main optical path of the microscope that is assigned to the main imaging area in such a way that the auxiliary light beam coupled into the microscope and the reflected part of the auxiliary light beam reflected by the reference boundary surface and not yet coupled out of the microscope pass through the at least an optical element.

18. The apparatus of claim 17, wherein the at least one optical element is a $\lambda/2$-plate.

19. The apparatus of claim 1 comprising a beam splitter configured and arranged to separate the reflected part of the auxiliary light beam reflected by the reference boundary surface from the auxiliary light beam.

20. The apparatus of claim 19, wherein the beam splitter is a polarizing beam splitter with a $\lambda/2$-plate on its object side.

21. The apparatus of claim 1 comprising a focus state stabilization conservation device configured to keep constant a position of the area of incidence of the reflected part of the coupled auxiliary light beam reflected by the reference boundary surface on the registration device by moving the reference boundary surface with regard to the microscope for compensating the registered position changes.

22. The apparatus of claim 1, wherein the auxiliary light source is configured and arranged within the apparatus to provide a further auxiliary light beam and to couple the further auxiliary light beam into the microscope in such a way that the auxiliary light beam and the further auxiliary light beam differ in respect of at least one of
their slant angles with regard to the normal to the object plane,
directions of straight lines which together with the normal to the object plane span the planes in which the auxiliary light beam and the further auxiliary light beam run, and
positions of points in which the auxiliary light beam and the further auxiliary light beam are focused with regard to the object plane.

23. The apparatus of claim 1, wherein the apparatus is configured to monitor the focal state of the microscope while an object located in the main imaging area is imaged by means of the microscope.

24. A microscope comprising an imaging system and an apparatus for monitoring the focal state of the microscope of claim 1.

* * * * *